(12) United States Patent
Tsuchida (10) Patent No.: US 8,823,814 B2
(45) Date of Patent: Sep. 2, 2014

(54) IMAGING APPARATUS (75) Inventor: Yukitaka Tsuchida, Osaka (JP)

(73) Assignee: Panasonic Corporation, Osaka (JP)

( * ) Notice: Subject to any disclaimer, the term of this patent is extended or adjusted under 35 U.S.C. 154(b) by 187 days.

(21) Appl. No.: 13/492,081

(22) Filed: Jun. 8, 2012

(65) Prior Publication Data

US 2012/0320227 A1 Dec. 20, 2012

(30) Foreign Application Priority Data

Jun. 10, 2011 (JP) .................................. 2011-129889

(51) Int. Cl.
*H04N 5/228* (2006.01)
*H04N 7/18* (2006.01)
*H04N 5/232* (2006.01)

(52) U.S. Cl.
CPC ....... *H04N 5/23258* (2013.01); *H04N 5/23274* (2013.01)
USPC ..................................... 348/208.99; 348/126

(58) Field of Classification Search
CPC .......... H04N 5/23258; H04N 5/23254; H04N 5/23267
USPC ................................. 348/208.99, 126, 208.2
See application file for complete search history.

(56) References Cited

U.S. PATENT DOCUMENTS

| 2002/0054213 | A1 | 5/2002 | Kawahara et al. |
| 2007/0291114 | A1* | 12/2007 | Oshima ......................... 348/126 |
| 2010/0177197 | A1* | 7/2010 | Kimura et al. ............. 348/208.2 |
| 2012/0038783 | A1 | 2/2012 | Noto et al. |

FOREIGN PATENT DOCUMENTS

| JP | 9-51466 | 2/1997 |
| JP | 2002-94877 | 3/2002 |
| JP | 2006-115346 | 4/2006 |
| JP | 2010-252123 | 11/2010 |
| JP | 2010-286651 | 12/2010 |

* cited by examiner

*Primary Examiner* — Twyler Haskins
*Assistant Examiner* — Padma Haliyur
(74) *Attorney, Agent, or Firm* — Wenderoth, Lind & Ponack, L.L.P.

(57) ABSTRACT

An imaging apparatus includes an optical system, an imaging device that captures an image imaged via the optical system to generate image data, a detecting unit that detects a shake of the imaging apparatus in a rotating direction, a cutting-out unit that cuts out data in a predetermined cutting-out region in a region of the image data generated by the imaging device, and a recording unit that records the cut image data in a recording medium. The cutting-out unit determines a rotating center position according to a predetermined condition (for example, the focal length of the optical system or move amount of the imaging apparatus), rotates the cutting-out region around the rotating center position to reduce an effect of the shake in the rotating direction detected by the detecting unit on the image imaged on the imaging device, and cuts out the image data from the rotated cutting-out region.

4 Claims, 7 Drawing Sheets

A CASE WHERE THE VIEW ANGLE IS AT A TELEPHOTO SIDE

Fig. 4A

A CASE WHERE THE VIEW ANGLE IS AT A WIDE-ANGLE SIDE

IMAGING APPARATUS

TECHNICAL FIELD

The present embodiment relates to an imaging apparatus, and particularly relates to an imaging apparatus having a camera shake correction function.

BACKGROUND

JP2002-94877 A discloses an electronic camera which can reduce an effect of camera shake in a rotating direction. Specifically, the electronic camera disclosed in JP2002-94877 A records image data of an image obtained by cutting out a part from an entire image (captured image) captured by an imaging device into a recording medium. Particularly this electronic camera rotates a cutting-out position of a captured image to a direction which cancels a camera shake of the electronic camera in the rotating direction, so that image data of which an effect of the camera shake in the rotating direction is reduced can be recorded in the recording medium.

In the electronic camera disclosed in JP2002-94877 A, a center position of the rotation for rotating camera shake correction is set according to one kind of preset rotating camera shake supposed in advance. As a result, only an effect of this one kind of rotating camera shake supposed in advance can be reduced, and thus effects of various rotating camera shakes cannot be eliminated.

SUMMARY

In view of the aforementioned problem, an imaging apparatus is provided which can achieve a rotating camera shake correction more suitably.

In one aspect of the present embodiment, an imaging apparatus includes an optical system, an imaging device for capturing an image imaged via the optical system and generating image data, a detecting unit for detecting a shake of a self apparatus in a rotating direction, a cutting-out unit for cutting out data in a predetermined cutting-out region in a region of the image data generated by the imaging device; and a recording unit for recording the cut image data in a recording medium. The cutting-out unit determines a rotating center position according to a predetermined condition (for example, a focal length of the optical system or a motion amount of the imaging apparatus), and rotates the cutting-out region around the rotating center position so that an effect of the shake in the rotating direction detected by the detecting unit on the image imaged on the imaging device is reduced, so as to cut out the image data from the rotated cutting-out region.

According to the imaging apparatus in the above aspect, a more suitable rotating center in the rotating camera shake correction is calculated according to the predetermined condition (for example, the focal length of the optical system or the motion amount of the imaging apparatus), and thus the more suitable rotating camera shake correction can be made.

DETAILED DESCRIPTION OF PREFERRED EMBODIMENT

Embodiments are described below with reference to the accompanying drawing. As one embodiment, an example using a digital video camera is described below.

1. First Embodiment 1-1. Outline

A digital video camera according to the embodiment has a camera shake correction function. The camera shake correction function is a function for reducing an effect of a shake of the self apparatus on a captured image.

Figure 7:
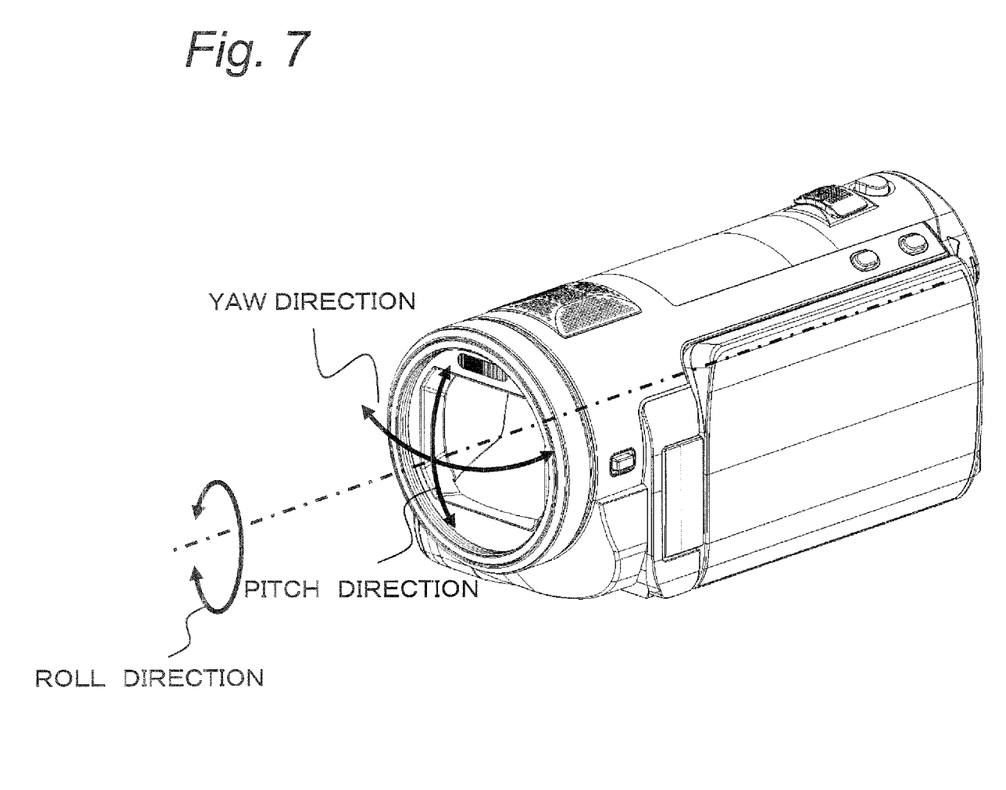
FIG. 7 is a view describing a type of a camera shake direction.

The digital video camera can correct camera shakes in a yaw direction, a pitch direction and a roll direction shown in FIG. 7. The digital video camera optically corrects the camera shake in the yaw direction and the camera shake in the pitch direction.

Particularly, in the camera shake correction in the roll direction (a rotating direction of rotation about an optical axis), the digital video camera rotates (moves) a cutting-out position of a captured image to a direction which cancels the camera shake in the roll direction so as to electronically correct the camera shake in the roll direction. The digital video camera determines a position of the rotating center around which the cutting-out position of a captured image is rotated according to the focal length of itself. As a result, the digital video camera can calculate a suitable rotating center in the rotating camera shake correction, and can make the more suitable camera shake correction.

1-2. Configuration

Figure 1:
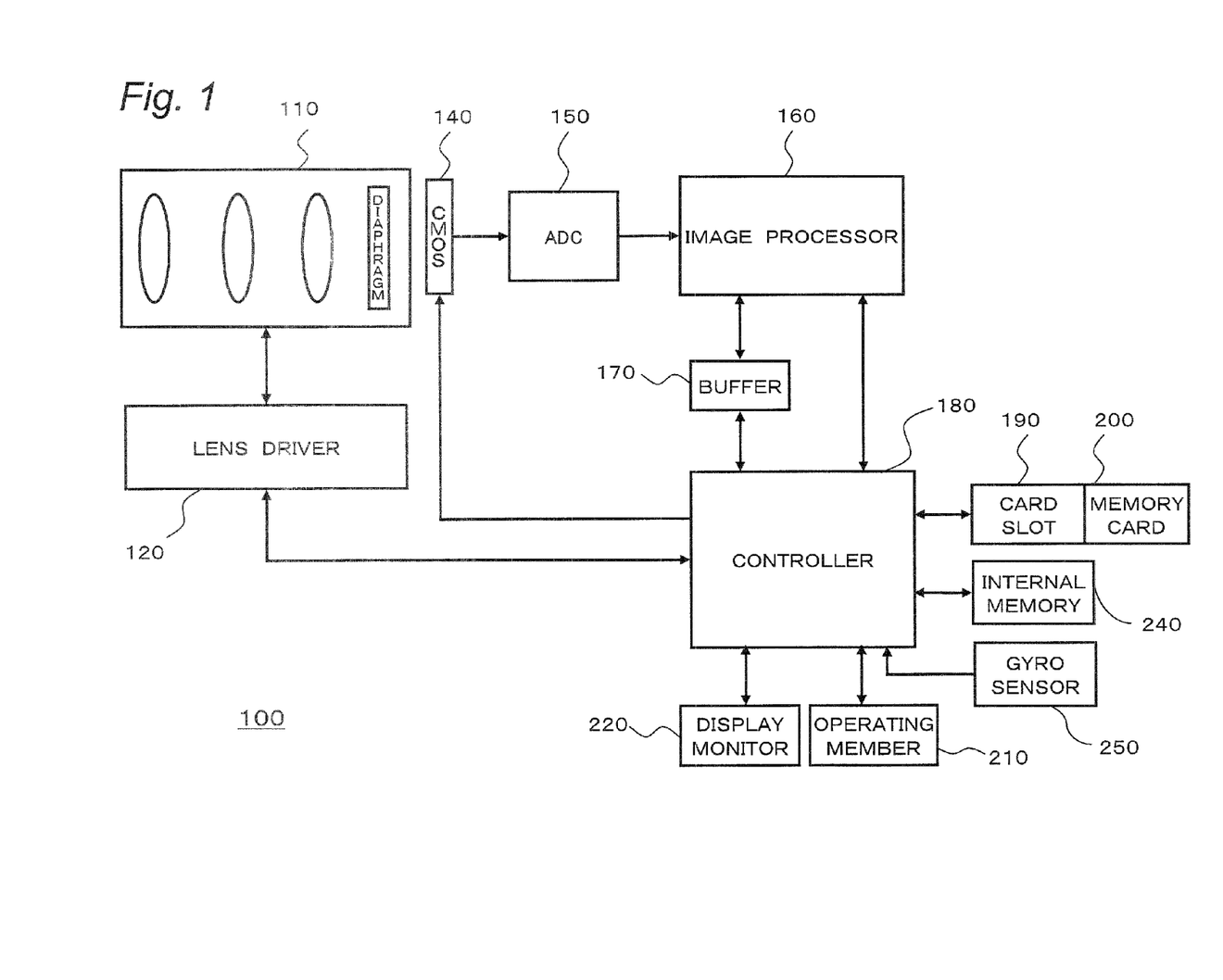
FIG. 1 is a block diagram showing an electrical configuration of a digital video camera.

An electric configuration of the digital video camera according to the embodiment is described with reference to FIG. 1. FIG. 1 is a block diagram showing a configuration of the digital video camera. The digital video camera 100 captures a subject image formed by an optical system 110 including one or a plurality of lenses using a CMOS image sensor 140. Image data generated by the CMOS image sensor 140 is subject to various processes in an image processor 160, and is stored in a memory card 200. More detailed configuration of the digital video camera 100 is described below.

The optical system 110 includes a zoom lens, a camera shake correction lens, a focus lens and a diaphragm. The zoom lens is moved along the optical axis so that a subject image can be enlarged or reduced. That is, when the zoom lens is moved along the optical axis, the focal length is changed so that a view angle can be adjusted. When the focus lens is moved along the optical axis, a focus state of a subject image can be adjusted. The camera shake correction lens can move in a plane vertical to the optical axis of the optical system 110. The camera shake correction lens is moved to a direction which cancels the shake of the digital video camera 100, so that the effect of the shake of the digital video camera 100 on the captured image can be reduced. A size of an opening of the diaphragm is changed automatically or according to user's setting, so that a quantity of light transmitting through the diaphragm is adjusted.

The optical system 110 further includes a zoom actuator for driving the zoom lens, a camera shake correction actuator for driving the camera shake correction lens, a focus actuator for driving the focus lens, and a diaphragm actuator for driving the diaphragm.

A lens driver 120 drives various lenses and the diaphragm included in the optical system 110. For example, the lens driver 120 controls the zoom actuator, the focus actuator, the camera shake correction actuator and the diaphragm actuator included in the optical system 110.

The CMOS image sensor 140 captures a subject image formed by the optical system 110 to generate image data. The CMOS image sensor 140 performs various operations such as exposure, transfer and electronic shutter.

An A/D converter 150 converts analog image data generated by the CMOS image sensor 140 into digital image data.

The image processor 160 applies various processes to the image data generated by the CMOS image sensor 140, to generate image data for displaying on a display monitor 220 or image data to be stored in the memory card 200. For example, the image processor 160 executes various processes such as gamma correction, white balance correction and damage compensation on the image data generated by the CMOS image sensor 140. Further, the image processor 160 compresses the image data generated by the CMOS image sensor 140 according to a compressing format such as H.264 standards or MPEG2 standards. The image processor 160 can be realized by a DSP or a microcomputer.

A controller 180 is a control unit for controlling the entire digital video camera. The controller 180 can be realized by one or a plurality of semiconductor elements. The controller 180 may be realized by only hardware or by a combination of hardware and software. The controller 180 can be realized by a microcomputer.

A buffer 170 functions as a work memory of the image processor 160 and the controller 180. The buffer 170 can be realized by, for example, a DRAM or a ferroelectric memory.

The memory card 200 can be attached to a card slot 190. The card slot 190 can be mechanically and electrically connected to the memory card 200. The memory card 200 contains a flash memory or a ferroelectric memory, and can store data such as an image file generated by the image processor 160.

An internal memory 240 includes a flash memory or a ferroelectric memory. The internal memory 240 stores a control program or the like for controlling the entire digital video camera 100.

An operating member 210 is a general name of a user interface that receives operations form a user. The operating member 210 includes, for example, a cross key, a determination button and a touch panel that receives user's operation.

The display monitor 220 can display an image (through image) represented by image data generated by the CMOS image sensor 140, and an image represented by image data read from the memory card 200. Further, the display monitor 220 can display also various menu screens for various settings of the digital video camera 100.

A gyro sensor 250 is a sensor for detecting an angular velocity of the digital video camera 100. The gyro sensor 250 can detect, as shown in FIG. 7, angular velocity in the yaw direction, the pitch direction and the roll direction (a peripheral direction about the optical axis of the optical system 110). The gyro sensor 250 notifies the detected angular velocity information to the controller 180. The controller 180 integrates the angular velocity information acquired by the gyro sensor 250 so that the digital video camera 100 can calculate the rotated angular information in the prescribed time.

1-3. Correspondence of Terms

The optical system 110 is one example of an optical system. The CMOS image sensor 140 is one example of an imaging device. The gyro sensor 250 is one example of a detecting unit. A configuration including the image processor 160 and the controller 180 is one example of a cutting-out unit. A configuration including the controller 180 and the card slot 190, or the controller 180 is one example of a recording unit.

1-4. Rotating Camera Shake Correction Operation

The digital video camera 100 according to the embodiment can reduce the effect of the camera shake in the rotating direction (the roll direction) (hereinafter, referred to as "rotating camera shake") which is applied on an image formed on the CMOS image sensor 140 by the shake of the digital video camera 100. That is, the digital video camera 100 has a function for correcting the camera shake in the rotating direction (the roll direction) (hereinafter, referred to as "rotating camera shake correction function").

Figure 2A:
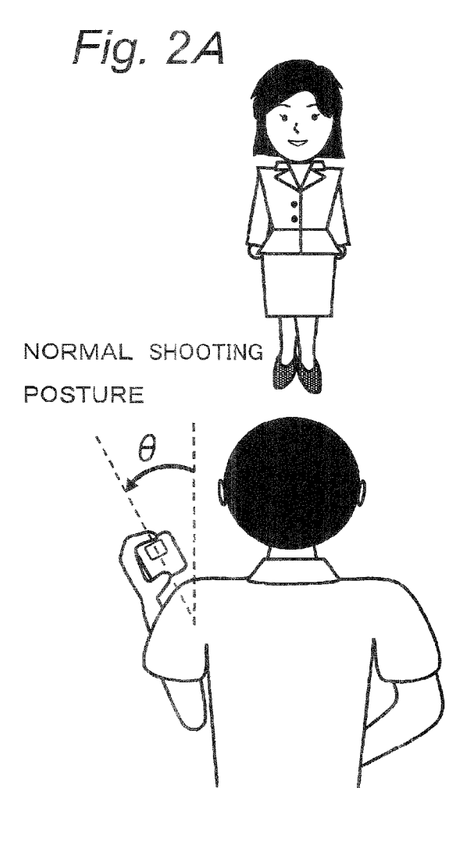
FIGS. 2A and 2B are views describing a rotating camera shake correction.
Figure 2B:
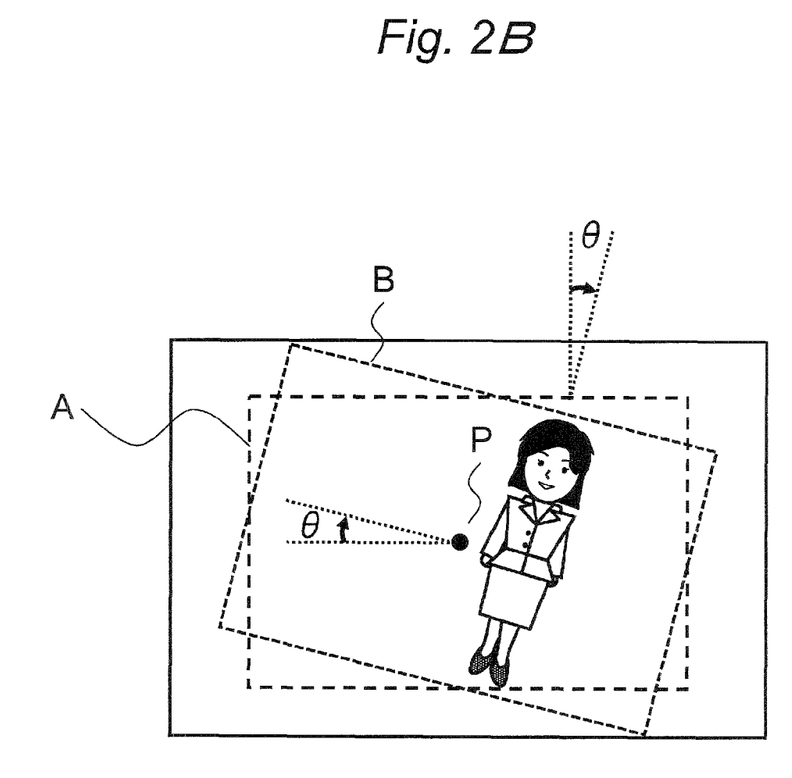

A specific method of the rotating camera shake correction is described with reference to FIGS. 2A and 2B. FIGS. 2A and 2B are schematic views describing the rotating camera shake correction. FIG. 2A is a view describing a relationship between a photographer and a subject. FIG. 2B is a schematic view showing an image shot in the relationship of FIG. 2A. In the following description, a posture of the digital video camera 100 that is maintained by the photographer when an image is shot in a normal use state is referred to as "normal shooting posture". The normal shooting posture of the digital video camera 100 is posture in which a horizontal direction and a vertical direction of the CMOS image sensor 140 match with a horizontal direction and a vertical direction in space, respectively.

As shown in FIG. 2A, it is assumed that the image is captured by the photographer with the digital video camera 100 shaked by θ° from the normal shooting posture in a counterclockwise direction. In this case, an image in a state that a subject tilts by θ° in a clockwise direction is captured on the CMOS image sensor 140 as shown in FIG. 2B. In FIG. 2B, a region A is a cutting-out region that is set when an image is captured in the normal shooting posture, and a region B is a cutting-out region that is set when an image is captured with the normal shooting posture shaked by θ° in the counterclockwise direction. That is, the digital video camera 100 sets the region B which is obtained by rotating the cutting-out region A set at the time of no rotation about the rotating center P by θ° in the clockwise direction, as the cutting-out region in the rotating camera shake correction. Then, image data in the region B is cut out. As a result, image data including a subject which does not tilt is cut out. In such a manner, the rotating camera shake correction enables an image whose shake in the rotating direction is reduced to be generated. Details of the rotating camera shake correction operation in the digital video camera 100 are described below.

1-4-1. Operation for Calculating Rotating Center

As described above, in the rotating camera shake correction, the cutting-out region of the image data is rotated about the rotating center in the direction which cancels the shake of the digital video camera 100 in the rotating direction. Particularly in this embodiment, the position of the rotating center in the rotating camera shake correction is set according to a predetermined condition. A method for setting the position of the rotating center of the cutting-out region is described below with reference to FIGS. 3 to 5.

Figure 3:
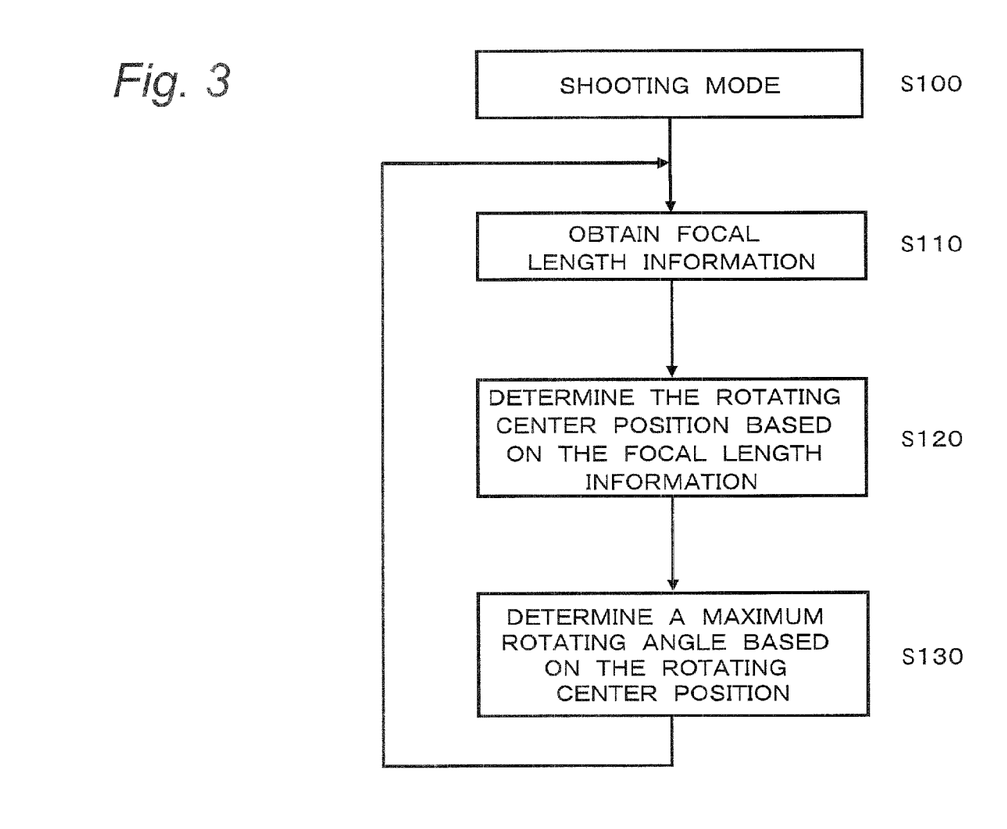
FIG. 3 is a flowchart describing an operation for determining a rotating center position.

FIG. 3 is a flowchart describing the operation for calculating the rotating center of the rotating camera shake correction. The user can set the digital video camera 100 to a shooting mode by operating a mode selection dial of the operating member 210. When the digital video camera 100 is set to the shooting mode (S100), the controller 180 monitors an instruction for changing the view angle (focal length) that is performed via a zoom lever of the operating member 210. When receiving the instruction for changing the view angle (focal length) via the zoom lever operated by the user, the controller 180 controls the lens driver 120 to drive the zoom lens according to the instruction. The controller 180 stores information (focal length information) relating to the focal length of the zoom lens after driving into an internal RAM (S110). Thereafter, the controller 180 determines the rotating center position for the rotating camera shake correction based on the stored focal length information (S120). The internal memory 240 stores an association table which relates the focal length to rotating center position, and the controller 180 can determine the rotating center position for the rotating camera shake correction with reference to this table based on the focal length information. A relationship between the focal length and the rotating center position is described later. Thereafter, the controller 180 determines a maximum rotating angle that is a maximum amount of the rotating angle settable in the rotating camera shake correction (S130). The maximum rotating angle is determined because a rotatable amount of the cutting-out region varies with the position of the rotating center. For example, the rotatable amount of the cutting-out region can be made larger in a case where the rotating center is set on the center position of the captured image than a case where the rotating center is set on a position separated from the center position of the captured image.

Figure 4A:
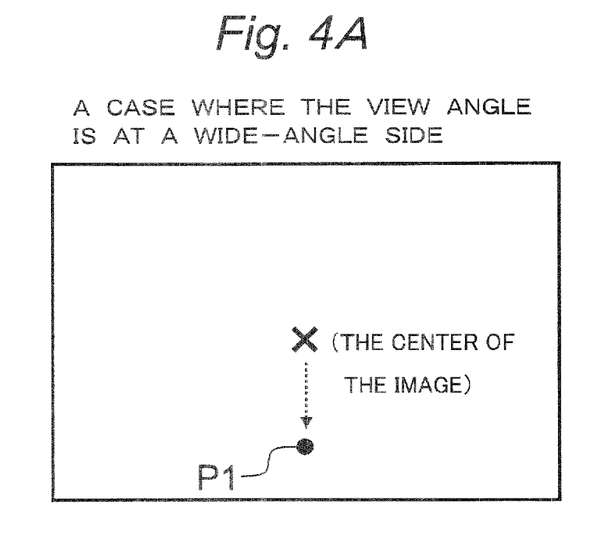
FIGS. 4A and 4B are views describing a rotating center position that changes according to a focal length of an optical system.
Figure 4B:
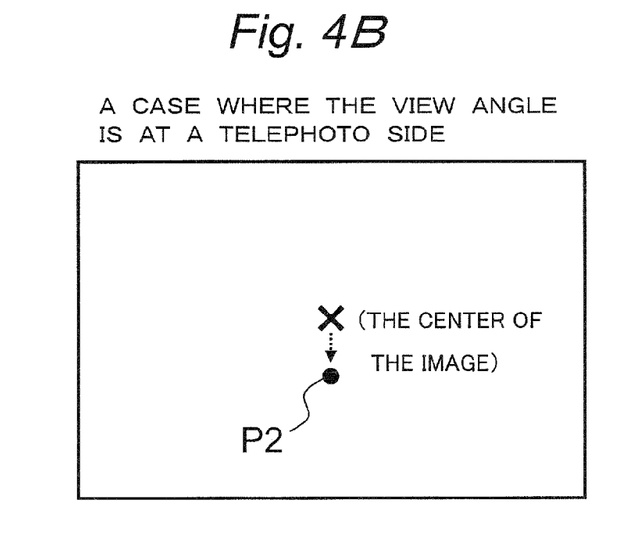
Figure 5:
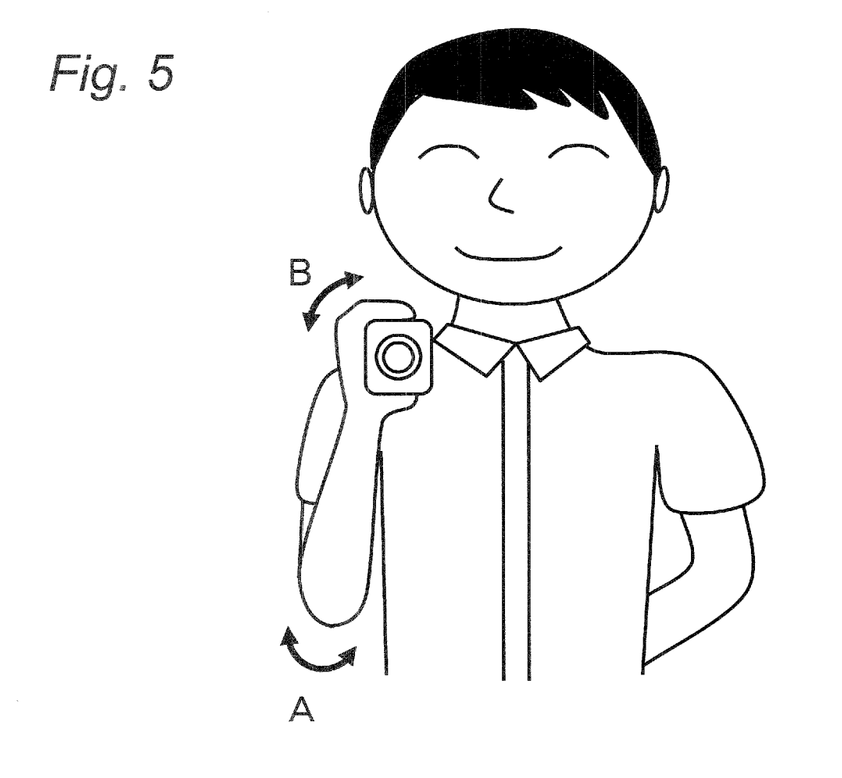
FIG. 5 is a view describing a reason for changing the rotating center position according to the focal length of the optical system.

The relationship between the focal length and the rotating center position is described below with reference to FIGS. 4A and 4B. The digital video camera 100 changes the rotating center position according to a fluctuation in the focal length of the optical system 110. That is, a shift amount of the rotating center from the center position of the captured image is adjusted according to the focal length of the optical system 110. Specifically, the digital video camera 100 sets the rotating center position so that a rotating center P for the rotating camera shake correction in a case where the focal length is at a wide-angle side shifts to a position in a captured image lower than a case where the focal length is at a telephoto side. FIG. 4A is a view describing the rotating center position in a case where the focal length is comparatively short, namely, the view angle is at the wide-angle side. FIG. 4B is a view describing the rotating center position in a case where the focal length is comparatively long, namely, the view angle is at the telephoto side. As shown in FIGS. 4A and 4B, the position P1 of the rotating center position in the case where the focal length is comparatively short (the wide-angle case) is set on a position in the captured image lower than the position P2 of the rotating center position in the case where the focal length is comparatively long. That is, as the focal length becomes shorter (namely, closer to the wide-angle), the rotating center position is set on a position separated farther from the center position of the image. The reason for setting in such a manner is described below.

When the user shoots an image while walking, mostly an image is captured in a state that the focal length is at the wide-angle side. In this case, it is considered that in the digital video camera 100, a shake around a user's elbow as the rotating center (a shake A shown in FIG. 5) easily exerts an effect on the captured image. On the other hand, when an image is captured in the state that the focal length is at the telephoto side, a subject is mostly captured in a state that the user does not move, namely, in a still state. In this case, it is considered that a shake around a user's wrist as the rotating center (a shake B shown in FIG. 5) easily exerts an effect on the captured image. From this viewpoint, it is considered that the rotating center of the rotating shake to be actually exerted on the captured image varies according to the set focal length. Therefore, in the digital video camera 100 according to this embodiment, the position of the rotating center in the state that the focal length is at the wide-angle side is set to a position separated farther from the center position of the image than the position of the rotating center in the state that the focal length is the telephoto side. Specifically, as the focal length is closer to the wide-angle side, the position of the rotating center is set to a position lower with respect to the center position of the captured image. As a result, in the rotating camera shake correction, the effect of the rotating shake can be effectively reduced.

1-4-2. Cutting-Out of Captured Image

Figure 6:
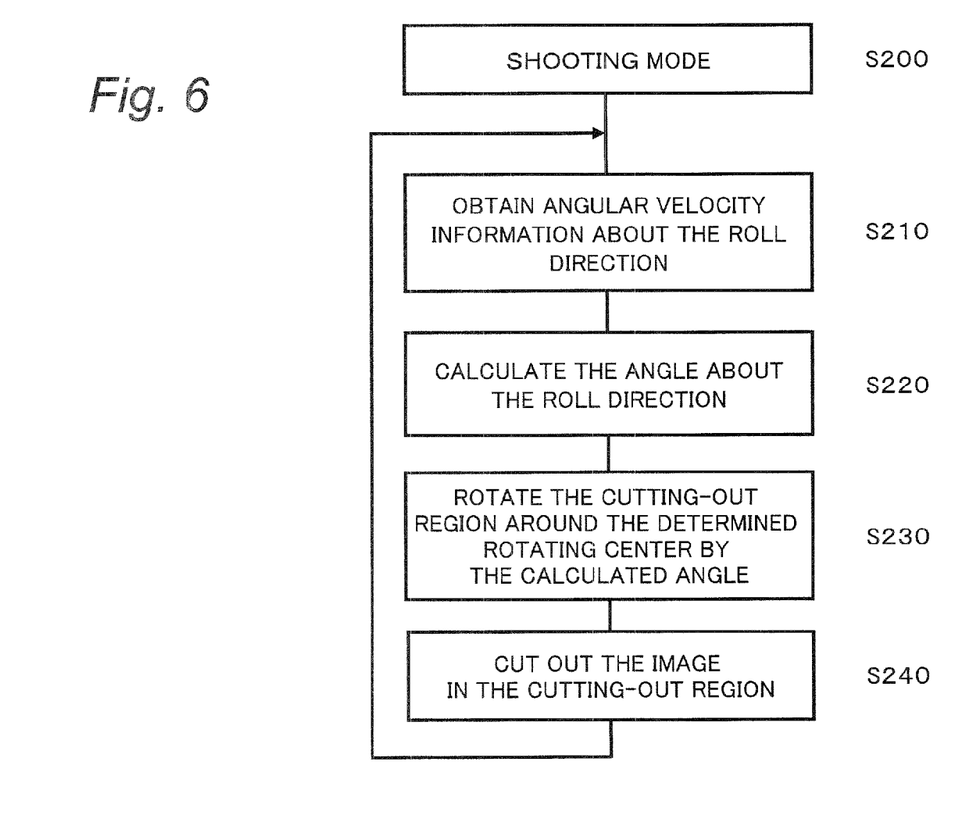
FIG. 6 is a flowchart describing an operation for determining a cutting-out position of a captured image.

A method for determining a cutting-out position of a captured image based on position information about the rotating center and information about the maximum rotating angle determined by the above described method is described below with reference to FIG. 6. FIG. 6 is a flowchart describing the operation for determining the cutting-out position of a captured image.

The user can set the digital video camera 100 to the shooting mode by operating the mode selection dial of the operating member 210. When the digital video camera 100 is set to the shooting mode (S200), the controller 180 obtains angular velocity information about the roll direction from the gyro sensor 250 (S210). The controller 180 integrates the obtained angular velocity information about the roll direction to calculate the angle information about the shake in the roll direction (S220). The angle represented by the calculated angle information is compared with the maximum rotating angle determined in step S130. When the calculated angle represented by the angle information exceeds the maximum rotating angle, the value represented by the angle information is set to the maximum rotating angle. The controller 180 rotates the cutting-out region A of the image data around the rotating center position determined in step S120 by the angle represented by the angle information calculated in step S220 (S230). An image is cut out from the rotated region (S240). The digital video camera 100 records the cut-out image data in the memory card 200. The digital video camera 100 repeats the process in steps S210 to S240 according to an updating frequency of a video signal. Since the digital video camera 100 updates a video signal with 60 (HZ), it executes also the process in steps S210 to S240 with 60 (HZ).

1-5. Conclusion

The digital video camera 100 according to this embodiment includes the optical system 110, the imaging device CMOS image sensor 140 which captures an image imaged via the optical system to generate image data, the gyro sensor 250 which detects the shake of the digital video camera 100 in the rotating direction, the configuration (cutting-out unit) which cuts out data in a predetermined cutting-out region in the region of the image data generated by the CMOS image sensor 140 and includes the image processor 160 and the controller 180, and the configuration (recording unit) which records the cut-out image data in the memory card 200 and includes the controller 180 and the card slot 190. The configuration (cutting-out unit) including the image processor 160 and the controller 180 determines the rotating center position according to the predetermined condition (in this example, the focal length of the optical system 110), and rotates the cutting-out region around the position of the rotating center P so that the effect of the shake in the rotating direction detected by the gyro sensor 250 on the image imaged on the CMOS image sensor 140 is reduced, so as to cut out image data from the cutting-out region after the rotation.

As described above, the digital video camera 100 according to this embodiment changes the position of the rotating center P for the rotating camera shake correction according to the focal length of the optical system 110. As a result, the rotating camera shake correction in which a characteristic of the rotating camera shake is taken into consideration according to the focal length can be realized. Specifically, it is considered that the rotating camera shake around the elbow exerts an effect on the captured image greatly at the wide-angle side while the rotating camera shake around the wrist exerts an effect on the captured image greatly at the telephoto side. Therefore, in the digital video camera 100, the rotating camera shake correction taking the characteristic of the rotating camera shake that varies according to the focal length into consideration can be realized.

2. Other Embodiments

The above has described the first embodiment as one embodiment. However, the embodiment is not limited to this. Other embodiments are described together below.

In the first embodiment, the position of the rotating center for the rotating camera shake correction is changed according to the focal length, but the rotating center may be changed based on other physical amounts.

For example, the position (shift amount) of the rotating center may be changed according to a motion amount of the digital video camera 100. When the motion (vibration) amount of the digital video camera 100 is large, it is considered that the user moves (walks or runs) while holding the digital video camera 100. In this case, it is considered that the shake around the user's elbow as the rotating center (the shake A shown in FIG. 5) is likely to exert an effect on the captured image in the digital video camera 100. On the other hand, when the user does not move, it is considered that the shake around the user's wrist as the rotating center (the shake B shown in FIG. 5) is likely to exert an effect on the captured image. Therefore, as the motion amount of the digital video camera 100 is larger, the position of the rotating center may be shifted lower (farther) from the center position of a captured image. The motion (vibration) amount of the digital video camera 100 can be detected based on an output from the gyro sensor. Alternatively, the motion (vibration) amount of the digital video camera 100 can be detected also by detecting a motion vector from the image. The controller 180 changes the position of the rotating center according to the detected motion (vibration) amount. Such a configuration can effectively reduce the effect of the rotating shake in the rotating camera shake correction.

Alternatively, the position of the rotating center for the rotating camera shake correction may be changed according to the shooting mode (scene mode). When a macro mode is selected as the shooting mode and an image is shot, it can be assumed that the user does not move. For this reason, when the macro mode is set, the position of the rotating center for the rotating camera shake correction may be set at the center of the captured image (even if the focal length is at the wide-angle side).

In the first embodiment, the position of the rotating center for the rotating camera shake correction is changed in a vertical direction of the image, but may be changed in a horizontal direction. For example, when the user holds the digital video camera 100 with the right hand to capture an image, the position of the rotating center for the rotating camera shake correction may be shifted from the center of the captured image in the horizontal direction. This is because when the user holds the digital video camera 100 with right hand, it is considered that the camera shake that causes the rotating camera shake is likely to occur on a right side with respect to the center of the captured image in a right-left direction.

In the first embodiment, the CMOS image sensor 140 is illustrated as an imaging unit, but the imaging unit is not limited to this. For example, the imaging unit may be realized by a CCD image sensor or an NMOS image sensor.

The image processor 160 and the controller 180 may be configured by one semiconductor chip, or may be configured by individual semiconductor chips.

The digital video camera 100 detects the camera shake in the roll direction with the gyro sensor 250. However, the digital video camera 100 does not have to always have such a configuration. For example, the camera shake in the roll direction may be detected by using motion vector information or the like that can be calculated based on the captured image. In other words, as long as the effect in the rotating direction, which is exerted on the image imaged on the imaging device by the shake of the digital video camera 100, can be detected, any unit and method can be utilized.

Further, the digital video camera 100 executes the process in steps S210 to S240 with the frequency of 60 (HZ). However, the digital video camera 100 does not have to always have such a configuration. For example, it may be a configured such that the process in steps S230 and S240 is executed with a frequency equivalent to the updating frequency of the video signal, and the process in steps S210 and step S220 is executed with the detecting frequency of the gyro sensor 250 (for example, 4 kHZ).

In the first embodiment, data of an image file or the like generated by the image processor 160 is recorded in the memory card 200, but may be recorded in a recording medium other than the memory card 200. For example, the data of the image file generated by the image processor 160 may be recorded in a recording medium built in the digital video camera 100 (a hard disc or a semiconductor memory).

In the first embodiment, the digital video camera is used as one example of an imaging apparatus, but the above idea can be applied to various imaging apparatuses such as digital still cameras, mobile telephones with camera functions and smartphones with camera functions.

INDUSTRIAL APPLICABILITY

The present embodiment can be applied to imaging apparatuses such as digital video cameras, digital still cameras, mobile telephones with camera functions and smartphones with camera functions.

What is claimed is:
1. An imaging apparatus comprising:
an optical system including a zoom lens;
an imaging device that captures an image imaged via the optical system to generate image data;
a detecting unit that detects a shake of the imaging apparatus in a rotating direction;
a cutting-out unit that cuts out data in a predetermined cutting-out region in a region of the image data generated by the imaging device; and
a recording unit that records the cut image data in a recording medium, wherein the cutting-out unit determines a rotating center position according to a focal length of the optical system, rotates the cutting-out region around the rotating center position so that an effect of the shake in the rotating direction detected by the detecting unit on the image imaged on the imaging device is reduced, and cuts out the image data from the rotated cutting-out region, wherein the cutting-out unit determines the rotating center position by setting the rotating center position to a position separated farther from a center position of an image represented by the image data generated by the imaging device as the focal length of the optical system becomes shorter, and wherein the cutting-out unit rotates the cutting-out region around the rotating center position by rolling the image represented by the image data generated by the imaging device in a rolling direction.

2. An imaging apparatus comprising:

an optical system;

an imaging device that captures an image imaged via the optical system to generate image data;

a detecting unit that detects a shake of the imaging apparatus in a rotating direction;

a cutting-out unit that cuts out data in a predetermined cutting-out region in a region of the image data generated by the imaging device;

a recording unit that records the cut image data in a recording medium; and a motion detecting unit that detects a motion amount of the imaging apparatus, wherein the cutting-out unit determines a rotating center position according to a motion amount of the imaging apparatus, rotates the cutting-out region around the rotating center position so that an effect of the shake in the rotating direction detected by the detecting unit on the image imaged on the imaging device is reduced, and cuts out the image data from the rotated cutting-out region, wherein the cutting-out unit determines the rotating center position by setting the rotating center position to a position separated farther from a center position of the image represented by the image data generated by the imaging device as the motion amount of the imaging apparatus is larger, and wherein the cutting-out unit rotates the cutting-out region around the rotating center position by rolling the image represented by the image data generated by the imaging device in a rolling direction.

3. The imaging apparatus according to claim 1, wherein when the focal length of the optical system is a first focal length, the cutting-out unit determines the rotating center position such that a first rotating center position is determined, and wherein when the focal length of the optical system is a second focal length shorter than the first focal length, the cutting-out unit determines the rotating center position such that a second rotating center position is determined, the second rotating center position being farther from the center position of the image represented by the image data generated by the imaging device than the first rotating center position.

4. The imaging apparatus according to claim 2, wherein when the motion amount of the imaging apparatus is a first motion amount, the cutting-out unit determines the rotating center position such that a first rotating center position is determined, and wherein when the motion amount of the imaging apparatus is a second motion amount larger than the first motion amount, the cutting-out unit determines the rotating center position such that a second rotating center position is determined, the second rotating center position being farther from the center position of the image represented by the image data generated by the imaging device than the first rotating center position.

* * * * *